J. F. CAMERON.
Cultivator.
No. 27,347. Patented Mar 6, 1860.
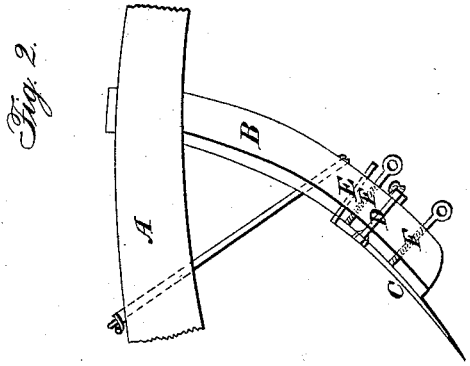
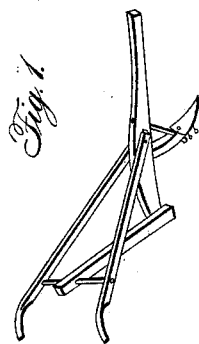
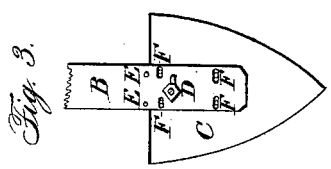
Witnesses:
Inventor:
John F Cameron By
John B Clark
his atty

UNITED STATES PATENT OFFICE.

JOSHUA F. CAMERON, OF LIVINGSTON COUNTY, MISSOURI.

IMPROVEMENT IN SHOVEL-PLOWS.

Specification forming part of Letters Patent No. 27,347, dated March 6, 1860.

*To all whom it may concern:*

Be it known that I, JOSHUA F. CAMERON, of Livingston county, Missouri, have invented an Improvement upon the Shovel-Plow; and I hereby declare the following to be a full and exact description thereof, reference being had to the accompanying drawings, forming a part of this specification, and to the letters of reference marked thereon.

The nature of my invention is a certain arrangement of parts by which I can alter and adjust the shovel so as to throw the soil on either side, and set it so as to run deeper or shallower, as may be desired.

To enable others skilled in the art to make and use my invention, I will proceed to describe its construction and mode of operation, the same letters referring to similar parts in the several figures.

Figure 1 is a perspective view of a shovel-plow having my improvement thereon. Fig. 2 is a section of part of the plow, showing the shoe, shovel, and other parts in which the novelty of my invention consists; and Fig. 3 is a posterior view of some of these parts.

In these figures, A represents the beam of the plow; B, the standard, whose curve is the arc of a circle, having its anterior edge made of an oval form to admit the turning of the face of the shovel inward or outward.

C is the shovel, curved like the standard B, and is attached to the latter by means of a hinge-screw, D, and is prevented from sliding by the rods E E, passing through the standard, against the projecting ends of which rods E E the upper edge of the shovel rests.

F F F F are set-screws working through nuts inserted in the standard, and forming at their anterior extremity pivots operating against the back of the shovel.

The mode of operation by which the shovel of this plow can be adjusted and fixed must from this description of its parts be easily comprehended. Whatever direction it may be required to set the face of the shovel is readily done by adjusting the set-screws. For instance, if it be required to set the face looking toward the right, the set-screws on that side must be withdrawn to a certain distance, and then the left advanced the required distance to give steady support and fixedness to the shovel. If it be desired to give the plow a deeper set, the two lower screws are withdrawn and the two upper advanced the required distance, and by reversing this position of the set-screws the point of the shovel may be thrown upward. By these several changes of position any desired effect may be accomplished in the use of this plow—that is, it may be made to plow deep or shallow, or to throw the soil on either side desired.

What I claim as my invention, and desire to secure by Letters Patent, is—

The arrangement of the beam A, standard B, shovel C, hinge-screw D, rods E E, and set-screws or pivots F F, as described, for the purposes set forth.

JOSHUA F. CAMERON.

Witnesses:
    DANL. G. SAUNDERS,
    JOHN Y. PORTER.